United States Patent
Brodjonegoro et al.

(10) Patent No.: US 12,378,630 B2
(45) Date of Patent: Aug. 5, 2025

(54) COMBINED HEAT EXCHANGE SYSTEM OF FLASH TANK AND PREHEATER FOR LATERITE NICKEL ORE LEACHING

(71) Applicants: PT ESG NEW ENERGY MATERIAL, Dki Jakarta (ID); PT QMB NEW ENERGY MATERIALS, Dki Jakarta (ID); GEM CO., LTD., Guangdong (CN); PT GEM INDONESIA NEW ENERGY MATERIALS, Dki Jakarta (ID)

(72) Inventors: Satryo Soemantri Brodjonegoro, Dki Jakarta (ID); Kaihua Xu, Guangdong (CN); Rizky Wanaldi, Dki Jakarta (ID); Tegar Mukti Aji, Dki Jakarta (ID); Aad Alief Rasyidi Baking, Dki Jakarta (ID); Andi Syaputra Hasibuan, Dki Jakarta (ID); Piyan Rahmadi, Dki Jakarta (ID); Yaguang Peng, Dki Jakarta (ID); Arnaldo Marulitua Sinaga, Dki Jakarta (ID)

(73) Assignees: GEM CO., LTD., Shenzhen (CN); PT GEM INDONESIA NEW ENERGY MATERIALS, Jakarta Selatan (ID)

( * ) Notice: Subject to any disclaimer, the term of this patent is extended or adjusted under 35 U.S.C. 154(b) by 0 days.

(21) Appl. No.: 18/870,451

(22) PCT Filed: Jun. 30, 2023

(86) PCT No.: PCT/CN2023/105026
§ 371 (c)(1),
(2) Date: Nov. 29, 2024

(87) PCT Pub. No.: WO2025/000494
PCT Pub. Date: Jan. 2, 2025

(65) Prior Publication Data
US 2025/0163536 A1 May 22, 2025

(51) Int. Cl.
*C22B 3/02* (2006.01)
*C22B 3/00* (2006.01)

(52) U.S. Cl.
CPC ........... *C22B 3/02* (2013.01); *C22B 23/0407* (2013.01)

(58) Field of Classification Search
CPC .............................. C22B 3/02; C22B 23/0407
(Continued)

(56) References Cited

U.S. PATENT DOCUMENTS

| 2,398,184 A | * | 4/1946 | Kleinschmidt | .......... B01D 1/28 202/187 |
| 2,538,738 A | * | 1/1951 | Stengel | .................. B01J 8/0005 422/201 |

(Continued)

FOREIGN PATENT DOCUMENTS

| CN | 107930171 A | 4/2018 |
| CN | 210384894 U | 4/2020 |

(Continued)

OTHER PUBLICATIONS

CN107930171, Chen et al., For High Temperature And High Pressure Reactor Discharging Flash Evaporator, Apr. 20, 2018 (Year: 2018).*

(Continued)

*Primary Examiner* — Jessee R Roe
*Assistant Examiner* — Michael Aboagye

(57) ABSTRACT

Disclosed is a combined heat exchange system of flash tank and preheater for laterite nickel ore leaching. The system comprises a high-pressure reactor, preheating towers, and flash tanks. The preheating tower is connected to the feed inlet of the high-pressure reactor. The flash tank is connected to the discharge outlet of the high-pressure reactor, and it is also connected to the preheating tower. Inside the flash tank, there is a pressure relief chamber and a buffering mechanism. The buffering mechanism comprises a buffering component and a connecting structure that are interconnected. In this disclosure, the buffering component of the pressure relief chamber is equipped with a central bulge and a buffering tank, materials falling from the pressure relief chamber can sequentially pass over the central bulge and (Continued)

slide from one end of the buffering tank to the other, then slide upwards out of the tank, achieving a buffering effect.

10 Claims, 4 Drawing Sheets

(58) Field of Classification Search
USPC .......... 266/168, 171, 176, 177; 423/27, 109
See application file for complete search history.

(56) References Cited

U.S. PATENT DOCUMENTS

| | | | |
|---|---|---|---|
| 3,689,366 A | | 9/1972 | Satone |
| 4,578,163 A | * | 3/1986 | Kunter .................... C22B 11/08 |
| | | | 75/744 |
| 5,489,326 A | * | 2/1996 | Thomas .................... C22B 3/02 |
| | | | 75/744 |
| 8,147,797 B2 | * | 4/2012 | Donaldson ........... B01J 19/0013 |
| | | | 422/615 |

FOREIGN PATENT DOCUMENTS

| | | | | |
|---|---|---|---|---|
| CN | 212440101 U | | 2/2021 | |
| CN | 216909207 U | | 7/2022 | |
| CN | 217612977 U | | 10/2022 | |
| CN | 116121472 A | | 5/2023 | |
| CN | 116790879 A | * | 9/2023 | ............... B01D 3/06 |

OTHER PUBLICATIONS

International Search Report issued in corresponding International application No. PCT/CN2023/105026, mailed Dec. 4, 2023 (10 pages).

Written Opinion of the International Search Authority in corresponding International application No. PCT/CN2023/105026, mailed Dec. 4, 2023 (9 pages).

* cited by examiner

COMBINED HEAT EXCHANGE SYSTEM OF FLASH TANK AND PREHEATER FOR LATERITE NICKEL ORE LEACHING

FIELD OF THE DISCLOSURE

The disclosure relates to the technical field of chemical equipment, in particular to a combined heat exchange system of flash tank and preheater for laterite nickel ore leaching.

BACKGROUND

Flash evaporation refers to the process in which high-pressure slurry in a high-pressure reactor enters a lower-pressure container, and due to the sudden decrease in pressure, these slurries become saturated steam and saturated slurry under container pressure. The boiling point of a substance is closely related to the pressure it is subjected to, usually manifested as an increase in boiling point when the pressure increases, and a decrease in boiling point when the pressure decreases. Therefore, the boiling point of high-pressure and high-temperature slurry will decrease after undergoing a depressurization process, leading to flash evaporation phenomenon. The function of a flash tank is to provide space for rapid vaporization and vapor-liquid separation of fluids.

There are many types of existing flash tank structures, such as the Chinese patent with publication number CN217612977U, which discloses a nickel flash tank based on caustic soda production, comprising a tank body, a head set at the top of the tank body, a first temperature measuring tube set on the right side inside the head, a first steam pipe set at the top of the head, a nitrogen pipe set on the left side inside the head, a second steam pipe fixedly installed on the left side of the tank body, a coil set at the bottom of the surface of the tank body, an anti-collision plate fixedly installed inside the tank body through connecting columns, and a second temperature measuring tube fixedly installed on the right side of the bottom of the tank body. When producing flake alkali, water containing alkali is transported to the interior of the tank body through an alkali inlet pipe, and during the transportation process, an anti-collision plate is used to avoid excessive pressure and impact on the head, which may cause instability of the tank body.

However, there are still shortcomings in this existing technology. For example, due to the fact that the force bearing part of the anti-collision plate is suspended inside the tank body, and the anti-collision plate itself does not have a buffering structure, it is easy for the anti-collision plate to deform after being impacted by materials for a long time and lose its buffering effect on impacts. Therefore, it is necessary to further improve the structure of the flash tank.

SUMMARY

The purpose of this disclosure is to provide a combined heat exchange system of flash tank and preheater for laterite nickel ore leaching to solve the technical problem in the existing technology that the force bearing part of the flash tank's anti-collision plate is suspended inside the tank body, and the anti-collision plate itself does not have a buffering structure, so the anti-collision plate is prone to deformation and lose its buffering effect on impact after being impacted by the material for a long time.

In order to solve the above technical problems, this disclosure provides a combined heat exchange system of flash tank and preheater for laterite nickel ore leaching, comprising:

a high-pressure reactor;

preheating towers, which is connected to the feed inlet of the high-pressure reactor;

flash tanks, which are connected to the discharge outlet of the high-pressure reactor, the flash tanks are also connected to the preheating towers through steam pipes; inside the flash tanks, there is a pressure relief chamber and a buffering mechanism, the buffering mechanism consists of a buffering component and a connecting structure, one side of the connecting structure is connected to the buffering component, while the other side is connected to the bottom of the pressure relief chamber; the side of the buffering component facing away from the connecting structure has a central bulge; around the central bulge, the buffering component has a buffering tank that is concave towards the connecting structure; the highest point of the central bulge is higher than the lowest point of the buffering tank, and the surface of the central bulge connects smoothly with the surface of the buffering tank; fluid falling in the pressure relief chamber can pass over the surface of the central bulge and slide out from one end of the buffering tank to the other.

Furthermore, the central bulge is conical, and the highest point of the central bulge is higher than any point in the buffering tank.

Furthermore, the buffering tank is an arcuate groove, with one end of the buffering tank being tangent to the surface of the central bulge.

Furthermore, the end of the buffering tank that is farthest from the central bulge is tangent to the wall of the pressure relief chamber.

Furthermore, the connecting structure comprises a first elastic frame, a second elastic frame, and a connecting component; the ends of the first elastic frame and the second elastic frame that are close to each other are connected by the connecting component; the end of the first elastic frame that is farther from the second elastic frame is connected to the buffering component, while the end of the second elastic frame that is farther from the first elastic frame is connected to the bottom of the pressure relief chamber.

Furthermore, the preheating tower comprises a tower body and a heat exchange component disposed inside the tower body; the heat exchange component is located on the inner wall of the tower body.

Furthermore, the number of the heat exchange components is multiple, and these heat exchange components are arranged at intervals vertically inside the tower body.

Furthermore, the heat exchange component comprises a first heat exchanger, a second heat exchanger, and a connecting body; the connecting body connects the first heat exchanger and the second heat exchanger; a circulation port is formed between the first heat exchanger and the second heat exchanger; the fluid inside the tower body can flow through the first heat exchanger, the circulation port, and then the second heat exchanger in sequence.

Furthermore, both the first heat exchanger and the second heat exchanger are conical; in the direction from the first heat exchanger to the second heat exchanger, the cross-sectional area of the first heat exchanger increases gradually, while the cross-sectional area of the second heat exchanger decreases gradually; the extension path of the first heat exchanger passes through the second heat exchanger.

Furthermore, the tower body has an air inlet located between the heat exchange component and the bottom of the tower body; the air inlet is used to introduce steam into the interior of the tower body, allowing the steam to mix with the fluid flowing through the preheating component.

Furthermore, the number of preheating towers is three, namely a first preheating tower, a second preheating tower, and a third preheating tower, the high pressure reactor, the first preheating tower, the second preheating tower, and the third preheating tower are connected in sequence; the number of flash tanks is also three, namely a first flash tank, a second flash tank, and a third flash tank, the high-pressure reactor, first flash tank, second flash tank, and third flash tank are connected in sequence.

Furthermore, the first flash tank is connected to the first preheating tower through a steam pipe, the second flash tank is connected to the second preheating tower through a steam pipe, and the third flash tank is connected to the third preheating tower through a steam pipe.

Compared with existing technologies, the beneficial effect of this disclosure is: the buffering component within the flash tank of this disclosure is strategically positioned at the base of the pressure relief chamber. When subjected to the impact of material descending from the pressure relief chamber, this component effectively transfers a significant portion of the force to the chamber's floor, minimizing the stress borne by the buffering component itself. Furthermore, the buffering component is endowed with a central bulge and a buffering tank. Material falling from the pressure relief chamber sequentially traverses the central bulge and then glides from one end of the buffering tank to the other, ultimately sliding upwards and exiting in a direction opposite to the incoming material. This counterflow collision between ascending and descending materials partially cancels out their mutual forces, enhancing the buffering effect. Consequently, when subjected to material impact, the buffering component exhibits resilience against deformation, ensuring its durability and longevity.

DETAILED DESCRIPTION OF PREFERRED EMBODIMENTS

The preferred embodiments of this disclosure will be described in detail with reference to the accompanying drawings, which constitute a part of the present application and are used together with the embodiments to illustrate the principles of this disclosure, and are not intended to limit the scope of this disclosure.

Figure 1:
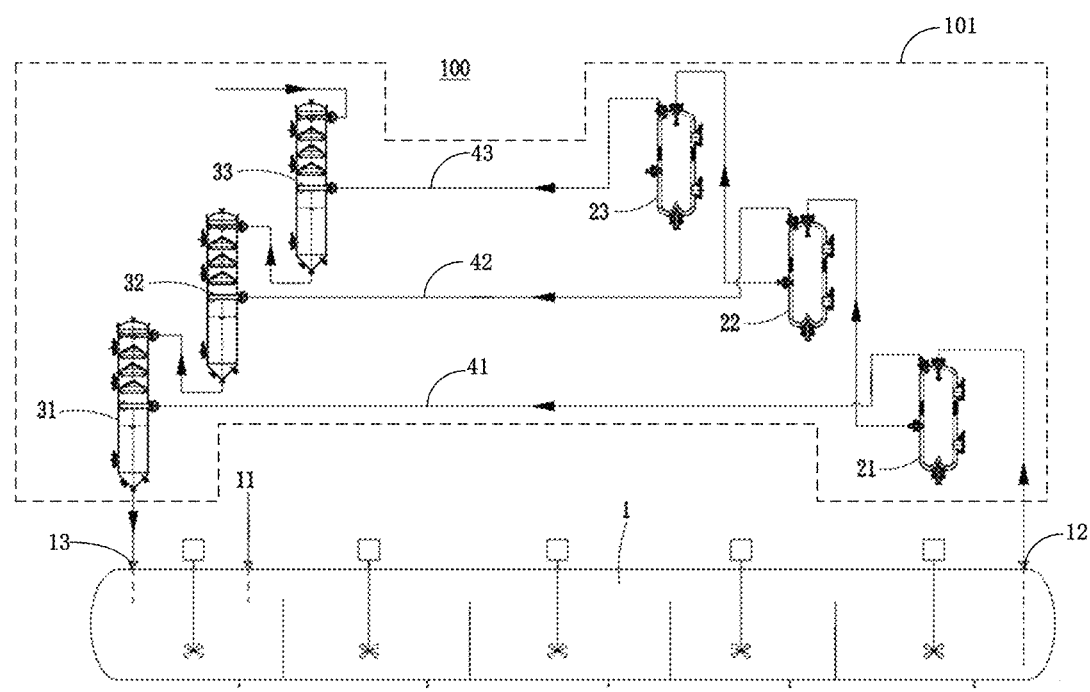
FIG. 1 is a schematic diagram of the structure of the combined heat exchange system of flash tank and preheater for laterite nickel ore leaching provided by this disclosure.
Figure 2:
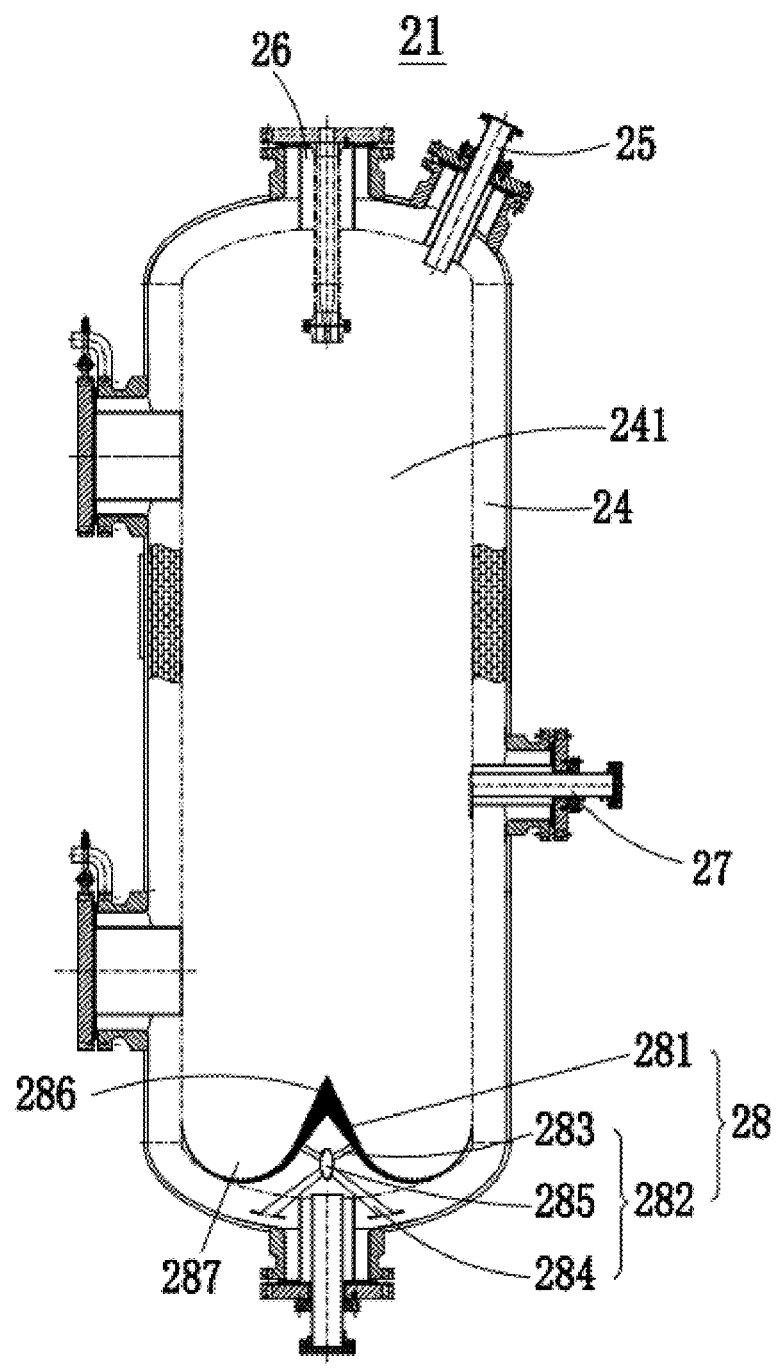
FIG. 2 is a schematic diagram of the structure of the first flash tank in FIG. 1.

Referring to FIG. 1, this disclosure provides a combined heat exchange system 100 of flash tank and preheater for laterite nickel ore leaching, aimed at extracting nickel and cobalt through smelting. The heat exchange system 100 is designed to perform multi-stage pressure relief during the discharge process, thereby safeguarding the equipment. Additionally, the heat released during this pressure relief can be recycled and reused, contributing to energy conservation.

The heat exchange system 100 comprises a high-pressure reactor 1 and a heat exchange device 101, wherein the heat exchange device 101 comprises flash tanks 21, 22, 23 and preheating towers 31, 32, 33. The discharge outlet 12 of the high-pressure reactor 1 is connected to the flash tanks 21, 22, 23, allowing the leached ore slurry from the reactor to undergo pressure relief and discharge through the flash tanks 21, 22, 23. The flash tanks 21, 22, 23 are connected to the preheating towers 31, 32, 33 enabling the heat released during the pressure relief process to be transferred to the preheating towers 31, 32, 33 for preheating the slurry raw materials within it. This ensures optimal utilization of the heat. The feed inlet 13 of the high-pressure reactor 1 is connected to the preheating towers 31, 32, 33, so that the slurry raw materials is preheated in the preheating towers 31, 32, 33 before entering the high-pressure reactor, thereby enhancing the reaction efficiency.

The high-pressure reactor 1 is equipped with a steam feed pipe 11, which serves as the connection point for an external steam source. This steam source continuously supplies high-temperature steam to the high-pressure reactor 1, providing the primary heating source for the slurry raw materials inside the high-pressure reactor.

In the embodiment illustrated in FIG. 1, there are three flash tanks designated as a first flash tank 21, a second flash tank 22, and a third flash tank 23. The high-pressure reactor 1, the first flash tank 21, the second flash tank 22, and the third flash tank 23 are sequentially connected, allowing the leached ore slurry from the high-pressure reactor to pass through the first flash tank 21, the second flash tank 22, and the third flash tank 23 in order before being outputted to the next processing step. The first flash tank, the second flash tank, and third flash tank progressively relieve the pressure of the ore slurry leached from the high-pressure reactor 1, preventing excessive pressure on any single flash tank and thus safeguarding each flash tank.

It is understandable that in other embodiments, the number of the flash tanks 2 is not limited and can vary. For instance, there could be two, four, or even more flash tanks, depending on the actual pressure relief requirements. Therefore, no excessive restrictions are placed on the number of flash tanks 2 in this context.

The number of the preheating towers 3 is three, specifically named as a first preheating tower 31, a second preheating tower 32, and a third preheating tower 33. The high-pressure reactor 1, the first preheating tower 31, the second preheating tower 32, and the third preheating tower 33 are sequentially connected. Slurry raw materials are fed into the third preheating tower 33 and then pass through the third preheating tower, the second preheating tower, and the first preheating tower in order before entering the high-pressure reactor 1. By undergoing gradual preheating in the third preheating tower, the second preheating tower, and the first preheating tower, the slurry raw materials enter the high-pressure reactor 1 in a preheated state, which enhances the reaction efficiency.

It is understandable that in other embodiments, the number of the preheating towers 3 is not limited and can vary. For example, there could be two, four, or even more preheating towers. Generally, with an increasing number of preheating towers 3, the heat content of the materials that ultimately reach the high-pressure reactor 1 will be higher. The number of the preheating towers 3 can be determined based on the actual preheating requirements, and no excessive restrictions are placed on this aspect.

The first flash tank 21 is connected to the first preheating tower 31 via a steam pipe 41, allowing the residual heat from the ore slurry after pressure release in the first flash tank 21 to be transferred to the first preheating tower 31 for heating the slurry raw materials flowing through it. Compared to other flash tanks, the first flash tank 21 releases the highest amount of heat after pressure release. The direct connection between the first preheating tower 31 and the high-pressure reactor 1 ensures that the heat released from the first flash tank 21 can be transmitted directly to the high-pressure reactor 1 via the first preheating tower 31, minimizing heat loss during transmission.

Similarly, the second flash tank 22 is connected to the second preheating tower 32 via a steam pipe 42, enabling the residual heat from the ore slurry after pressure release in the second flash tank 22 to be transferred to the second preheating tower 32 for heating the slurry raw materials flowing through it.

The third flash tank 23 is connected to the third preheating tower 33 via a steam pipe 43, allowing the residual heat from the ore slurry after pressure release in the third flash tank 23 to be transferred to the third preheating tower 33 for heating the slurry raw materials flowing through it.

The structures of the first flash tank 21, second flash tank 22, and third flash tank 23 are identical. Therefore, taking the first flash tank 21 as an example, we will further elaborate on the structure of the flash tank 2.

The first flash tank 21 comprises a tank body 24, as well as an air outlet 25, a feed inlet 26, and a discharge outlet 27 located on the tank body 24. Specifically, both the air outlet 25 and the feed inlet 26 are positioned at the top of the tank body 24, while the discharge outlet 27 is located on the side of the tank body 24.

Inside the tank body 24, there is a pressure relief chamber 241. The air outlet 25, the feed inlet 26, and the discharge outlet 27 are all connected to the pressure relief chamber 241, and they can control the connection and disconnection with the external air of the tank body 24 through corresponding switches.

The tank body 24 is connected to the high-pressure reactor 1 through the feed inlet 26. The high-pressure slurry leached from the high-pressure reactor 1 can be fed into the pressure relief chamber 241 through the feed inlet 26, falling from the top to the bottom of the pressure relief chamber 241.

The tank body 24 is connected to the second flash tank 22 through the discharge outlet 27, allowing the slurry in the pressure relief chamber 241 to be fed into the second flash tank 22 for further pressure release. It is important to note that the discharge outlet of the third flash tank 23 is used to connect to the next processing step, so that the slurry outputted from the third flash tank 23 can enter the next processing step through a material inlet for further processing.

The tank body 24 is connected to the first preheating tower 31 through the air outlet 25, enabling the heat within the pressure relief chamber 241 to be transferred to the first preheating tower 31 via the air outlet 25.

The first flash tank 21 comprises a buffering mechanism 28 located within the tank body 24, specifically at the bottom of the pressure relief chamber 241. The buffering mechanism 28 serves to cushion the slurry falling from the feed inlet 26, preventing it from directly impacting the walls of the pressure relief chamber 241 and potentially damaging the tank body 24.

The buffering mechanism 28 comprises a buffering component 281 and a connecting structure 282. One end of the connecting structure 282 is connected to the buffering component 281, while the other end of the connecting structure 282 is connected to the bottom of the pressure relief chamber 241, securing the buffering component 281 in place.

The connecting structure 282 comprises a first elastic frame 283, a second elastic frame 284, and a connecting component 285. The ends of the first elastic frame 283 and the second elastic frame 284 that are close to each other are connected by the connecting component 285. The end of the first elastic frame 283 that is far from the second elastic frame 284 is connected to the buffering component 281, while the end of the second elastic frame 284 that is far from the first elastic frame 283 is connected to the bottom of the pressure relief chamber 241.

Both the first elastic frame 283 and the second elastic frame 284 are shaped in a V-form, with their pointed ends being connected by the connecting component 285. The connecting component 285 can be a welded body, and the first elastic frame 283 and the second elastic frame 284 are connected through welding.

Both the first elastic frame 283 and the second elastic frame 284 are made of elastic metal, allowing the buffering component 281 to transmit impact forces from the slurry to the first elastic frame 283 and the second elastic frame 284 when impacted. Through elastic buffering, the first elastic frame 283 and the second elastic frame 284 can stably cushion the impact forces transmitted from the buffering component 281.

It is understandable that in other embodiments, the connecting structure 282 can also consist solely of a spring, with the two ends of the spring being connected to the buffering component 281 and the bottom of the pressure relief chamber 241, respectively. When the buffering component 281 is subjected to the force of the slurry, it can directly transmit the force to the spring for cushioning.

The buffering component 281 has a central bulge 286 protruding towards the feed inlet 26 at its center. The central bulge 286 is conical in shape, allowing the slurry falling from the feed inlet 26 to slide along its surface. The side of the central bulge 286 that faces away from the feed inlet 26 is connected to the first elastic frame 283, securing the buffering component 281 in place.

The buffering component 281 has a buffering tank 287 opening around the central bulge 286. It is understandable that the buffering tank 287 is annular in shape. In the radial direction of the pressure relief chamber 241, the surface of the buffering tank 287 is arcuate, and one end of the buffering tank 287 is tangent to the surface of the central bulge 286, allowing the slurry to slide more smoothly into the buffering tank 287 after passing over the surface of the central bulge 286 and then out from the other end of the buffering tank 287. The other end of the buffering tank 287 is tangent to the wall of the pressure relief chamber 241, so that after the slurry slides out of the buffering tank 287, it can minimize impact on the wall of the pressure relief chamber 241, thereby protecting the wall of the pressure relief chamber 241.

Furthermore, after the slurry slides up and out of the buffering tank 287, the outgoing slurry can come into contact with the subsequent slurry falling from the feed inlet 26, thereby canceling out a portion of the mutual forces and reducing the impact force of the falling slurry on the buffering component 281. This is beneficial for protecting the buffering component 281.

In other embodiments, the top of the central bulge 286 can also be set as a horizontal plane, and the buffering tank 287 does not necessarily need to be tangent to the central bulge 286 or the pressure relief chamber 241. Simply setting the surface of the buffering tank 287 as arcuate can also provide cushioning for the falling slurry.

The structures of the first preheating tower 31, the second preheating tower 32, and the third preheating tower 33 are identical. Taking the first preheating tower 31 as an example, we will further describe the structure of the preheating tower 3.

The first preheating tower 31 comprises a tower body 311 and a preheating chamber 312, a material inlet 313, a discharge port 314, an air inlet 315, a drain outlet 316, and a steam import 317, all located within the tower body 311. Among them, the material inlet 313 is positioned near the top of the tower body 311 to facilitate the entry of slurry raw materials into the preheating chamber 312, allowing them to fall within the preheating chamber 312.

The material inlet 313, discharge port 314, air inlet 315, drain outlet 316, and steam import 317 are all connected to the preheating chamber 312 and are equipped with corresponding on-off valves to control the flow of air to and from the external environment of the tower body 311.

The material inlet 313 is used to connect to the discharge port 314 of the second preheating tower 32, allowing the slurry raw materials within the second preheating tower 32 to enter the preheating chamber 312 through the material inlet 313. It should be emphasized that the material inlet of the third preheating tower 33 is used for inputting slurry raw materials, which then enter the second preheating tower 32 through the discharge port of the third preheating tower 33.

The discharge port 314 is used to connect to the high-pressure reactor 1, allowing the preheated slurry raw materials from the preheating chamber 312 to enter the high-pressure reactor through the discharge port 314.

The drain outlet 316 is used for draining waste liquid from within the preheating chamber 312 to facilitate cleaning of the preheating chamber 312.

The air inlet 315 is used to connect to the air outlet 25 of the first flash tank 21, allowing the steam from the first flash tank 21 to be transported into the preheating chamber 312 through the air inlet 315 to preheat the slurry raw materials within the preheating chamber 312, thereby making full use of the thermal energy.

the steam import 317 serves as a critical interface for connecting an external steam supply source. The high-temperature steam generated by this supply source can be fed into the preheating chamber 312 through the steam import 317, effectively preheating the slurry raw materials in the preheating chamber 312. The steam supply source constitutes the primary source of heat for preheating these slurry raw materials. Meanwhile, the steam originating from the first flash tank 21 typically plays a supplementary role in this preheating process.

The first preheating tower 31 comprises a heat exchange component 34 located within the preheating chamber 312. Upon contact with high-temperature steam, the heat exchange component 34 generates heat, which in turn warms the slurry raw materials that flow through it.

The air inlet 315 is positioned between the heat exchange component 34 and the bottom of the tower body 311. As the slurry raw materials pass through the heat exchange component 34 and descend, the high-temperature steam entering through the air inlet 315 rises within the preheating chamber 312, mixing with the descending slurry raw materials to ensure thorough heating of the slurry raw materials.

The heat exchange component 34 comprises a first heat exchanger 341, a second heat exchanger 342, and a connecting body 343. The connecting body 343 links the first heat exchanger 341 and the second heat exchanger 342 together. The second heat exchanger 342 is attached to the wall of the preheating chamber 312, which serves to stabilize and fix the heat exchange component 34 in place.

The number of connecting bodies 343 is plural, and these connecting bodies 343 are arranged around the perimeter of the first heat exchanger 341. Each connecting body 343 has two ends, one connected to the edge of the first heat exchanger 341 and the other to the edge of the second heat exchanger 342, effectively linking the first heat exchanger 341 and the second heat exchanger 342 together.

The first heat exchanger 341 and the second heat exchanger 342 are spaced apart to form a circulation port 344. The slurry raw materials in the preheating chamber 312 can flow through the first heat exchanger 341, the circulation port 344, and the second heat exchanger 342 in sequence, before falling to the bottom of the preheating chamber 312.

Both the first heat exchanger 341 and the second heat exchanger 342 are conical in shape. In the direction from the first heat exchanger 341 to the second heat exchanger 342, the cross-sectional area of the first heat exchanger 341 increases, while the cross-sectional area of the second heat exchanger 342 decreases. The cross-section refers to a plane perpendicular to the central axis of the first heat exchanger 341.

The extension path of the first heat exchanger 341 intersects with the edge of the second heat exchanger 342, allowing the slurry raw materials flowing over the outer surface of the first heat exchanger 341 to pass through the circulation port 344 and reach the inner surface of the second heat exchanger 342. The second heat exchanger 342 is hollow with open ends, allowing the slurry raw materials to flow along its inner surface and then fall down to the bottom of the preheating chamber 312.

Figure 3:
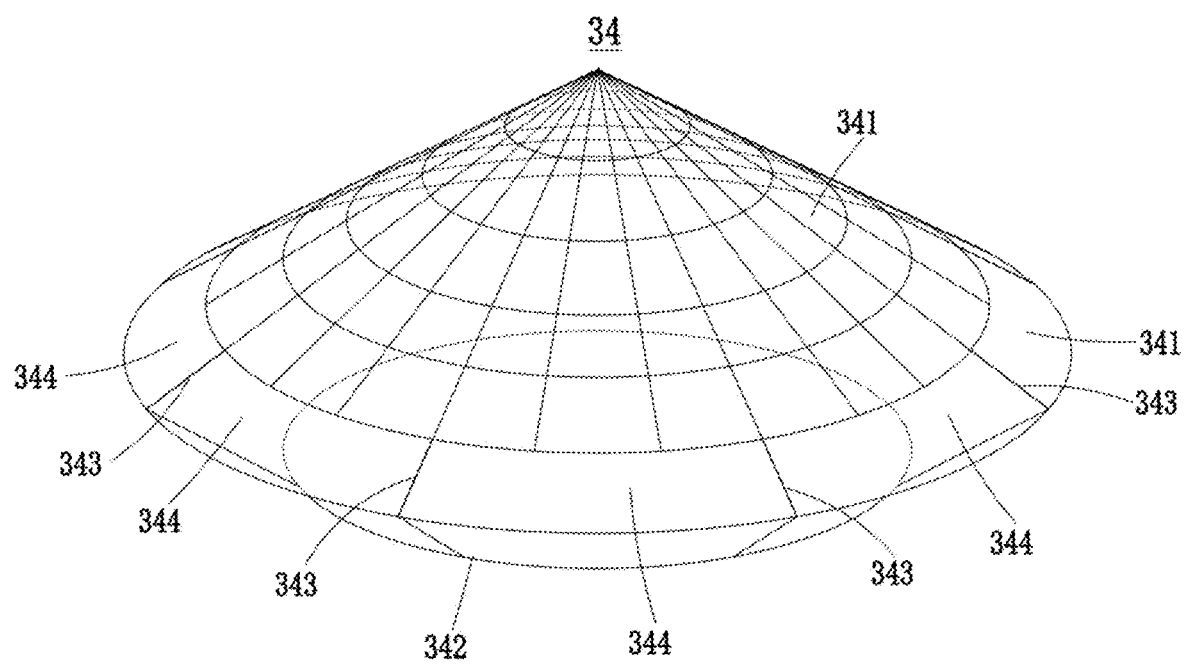
FIG. 3 is a schematic diagram of the buffering mechanism in FIG. 1.
Figure 4:
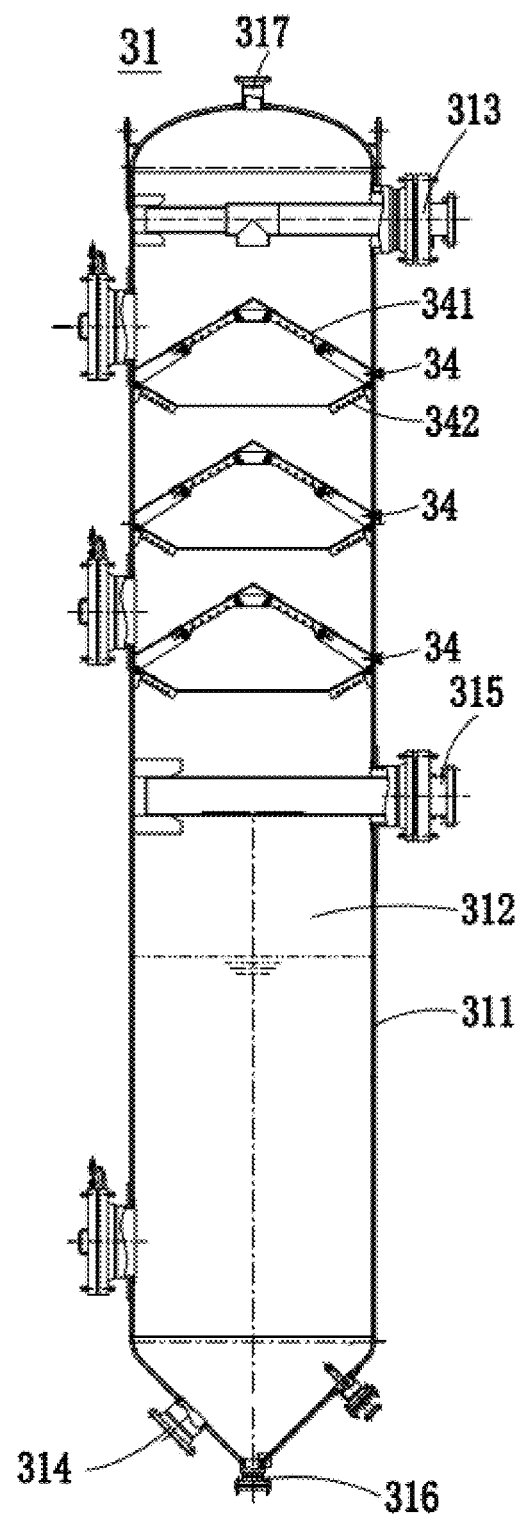
FIG. 4 is a schematic diagram of the structure of the first preheating tower in FIG. 1.

In the embodiment shown in FIG. 3, there are three heat exchange components 34, arranged at intervals above and below within the preheating chamber 312. As the slurry raw materials fall, they will sequentially pass through each heat exchange component 34. Each time they pass through a heat exchange component 34, the component will heat the slurry raw materials. The more heat exchange components 34 the slurry raw materials pass through, the higher their temperature will be. In other embodiments, the number of heat exchange components 34 can be varied, such as two, four, or more, and is not limited to the specific numbers mentioned here.

This disclosure achieves gradual pressure release for the high-pressure reactor 1 by setting up multiple-stage flash tanks. The buffering mechanism 28 installed inside the flash tank can cushion the downward rushing slurry, preventing it from directly impacting the bottom and sides of the flash tank. This is beneficial for protecting the flash tank.

The multi-stage preheating tower set up can preheat the slurry raw materials layer by layer, so that the temperature of the slurry is higher when it enters the high-pressure reactor. This is conducive to improving the reaction efficiency. The excess heat generated during the pressure release process of the flash tank can be transferred to the preheating tower, facilitating the recovery and recycling of heat and saving energy.

The above is only a preferred specific embodiment of this disclosure, but the scope of protection of this disclosure is not limited to this. Any changes or substitutions that can be easily conceived by those skilled in the art within the scope of the disclosed technology should be included in the scope of protection of this disclosure.

What is claimed is:

1. A combined heat exchange system of flash tank and preheater for laterite nickel ore leaching: comprising:
a high-pressure reactor;
preheating towers, which are connected to a feed inlet of the high-pressure reactor;
flash tanks, which are connected to a discharge outlet of the high-pressure reactor, the flash tanks are also connected to the preheating towers through steam pipes; inside the flash tanks, there is a pressure relief chamber and a buffering mechanism, the buffering mechanism consists of a buffering component and a connecting structure, one side of the connecting structure is connected to the buffering component, while an other side is connected to a bottom of the pressure relief chamber; a side of the buffering component facing away from the connecting structure has a central bulge; around the central bulge, the buffering component has a buffering tank that is concave towards the connecting structure; a highest point of the central bulge is higher than the lowest point of the buffering tank, and a surface of the central bulge connects smoothly with the surface of the buffering tank; fluid falling in the pressure relief chamber passes over the surface of the central bulge and slide out from one end of the buffering tank to the other;
wherein the central bulge is conical, and the highest point of the central bulge is higher than any point in the buffering tank, the buffering tank is an arcuate groove, with one end of the buffering tank being tangent to the surface of the central bulge.

2. The combined heat exchange system of flash tank and preheater for laterite nickel ore leaching according to claim 1, the end of the buffering tank that is farthest from the central bulge is tangent to the wall of the pressure relief chamber.

3. The combined heat exchange system of flash tank and preheater for laterite nickel ore leaching according to claim 1, the connecting structure comprises a first elastic frame, a second elastic frame, and a connecting component; ends of the first elastic frame and the second elastic frame that are close to each other are connected by the connecting component; the end of the first elastic frame that is farther from the second elastic frame is connected to the buffering component, while the end of the second elastic frame that is farther from the first elastic frame is connected to the bottom of the pressure relief chamber.

4. The combined heat exchange system of flash tank and preheater for laterite nickel ore leaching according to claim 1, the preheating tower comprises a tower body and a heat exchange component disposed inside the tower body; the heat exchange component is located on an inner wall of the tower body.

5. The combined heat exchange system of flash tank and preheater for laterite nickel ore leaching according to claim 4, a number of the heat exchange components is multiple, and the heat exchange components are arranged at intervals vertically inside the tower body.

6. The combined heat exchange system of flash tank and preheater for laterite nickel ore leaching according to claim 4, the heat exchange component comprises a first heat exchanger, a second heat exchanger, and a connecting body; the connecting body connects the first heat exchanger and the second heat exchanger; a circulation port is formed between the first heat exchanger and the second heat exchanger; the fluid inside the tower body can flow through the first heat exchanger, the circulation port, and then the second heat exchanger in sequence.

7. The combined heat exchange system of flash tank and preheater for laterite nickel ore leaching according to claim 6, both the first heat exchanger and the second heat exchanger are conical in a direction from the first heat exchanger to the second heat exchanger, the cross-sectional area of the first heat exchanger increases gradually, while a cross-sectional area of the second heat exchanger decreases gradually; an extension path of the first heat exchanger passes through the second heat exchanger.

8. The combined heat exchange system of flash tank and preheater for laterite nickel ore leaching according to claim 4, the tower body has an air inlet located between the heat exchange component and the bottom of the tower body; the air inlet is used to introduce steam into the interior of the tower body, allowing the steam to mix with the fluid flowing through the preheating component.

9. The combined heat exchange system of flash tank and preheater for laterite nickel ore leaching according to claim 1, the number of preheating towers is three, namely a first preheating tower, a second preheating tower, and a third preheating tower, the high pressure reactor, the first preheating tower, the second preheating tower, and the third preheating tower are connected in sequence; the number of flash tanks is also three, namely a first flash tank, a second flash tank, and a third flash tank, the high-pressure reactor, first flash tank, second flash tank, and third flash tank are connected in sequence.

10. The combined heat exchange system of flash tank and preheater for laterite nickel ore leaching according to claim 9, the first flash tank is connected to the first preheating tower through a steam pipe, the second flash tank is connected to the second preheating tower through a steam pipe, and the third flash tank is connected to the third preheating tower through a steam pipe.

* * * * *